United States Patent [19]

Hahn et al.

[11] Patent Number: 5,045,252
[45] Date of Patent: Sep. 3, 1991

[54] METHOD AND APPARATUS FOR CONTROLLING ROTARY EXTRUDER

[75] Inventors: Granville J. Hahn; Allen C. Bailey, both of Big Spring; Richard D. Antrim, Midland, all of Tex.

[73] Assignee: Permian Research Corporation, Big Spring, Tex.

[21] Appl. No.: 425,937

[22] Filed: Oct. 24, 1989

[51] Int. Cl.$^5$ .................. B29C 47/00; B29C 47/36; B29C 47/92
[52] U.S. Cl. .................. 264/40.5; 222/55; 222/63; 264/40.7; 264/349; 366/99; 366/132; 366/151; 366/182; 425/135; 425/145; 425/190; 425/207; 425/382.3
[58] Field of Search ............ 264/40.1, 40.5, 40.7, 264/176.1, 211.21, 211.23, 349; 425/135, 145, 190, 207, 209, 381.2, 382.3; 366/79, 99, 132, 135, 151, 156, 182, 318; 222/55, 56, 57, 63

[56] References Cited

U.S. PATENT DOCUMENTS

| | | | |
|---|---|---|---|
| 2,747,222 | 5/1956 | Koch et al. | 264/211.21 |
| 2,747,224 | 5/1956 | Koch et al. | 264/211.21 |
| 3,283,041 | 11/1966 | Sommerfeld | 264/176.1 X |
| 3,357,049 | 12/1967 | Spindler | 425/146 |
| 3,391,232 | 7/1968 | Jackson | 264/40.7 |
| 3,704,972 | 12/1972 | Kneller et al. | 425/145 |
| 3,755,516 | 8/1973 | Bonikowski et al. | 264/40.7 X |
| 3,880,564 | 4/1975 | Beck et al. | 425/209 |
| 4,012,477 | 3/1977 | Beck et al. | 264/176.1 |
| 4,171,193 | 10/1979 | Rahlfs | 425/145 X |
| 4,197,070 | 4/1980 | Koschmann | 425/135 |
| 4,290,986 | 9/1981 | Koschmann | 264/40.6 X |
| 4,336,213 | 6/1982 | Fox | 264/40.1 |
| 4,478,775 | 10/1984 | Endo et al. | 264/40.1 X |
| 4,501,543 | 2/1985 | Rutledge et al. | 425/381.2 X |
| 4,721,589 | 1/1988 | Harris | 264/40.1 |
| 4,813,863 | 3/1989 | Hahn et al. | 425/207 X |
| 4,882,105 | 11/1989 | Volk, Jr. | 264/40.1 |

*Primary Examiner*—Leo B. Tentoni
*Attorney, Agent, or Firm*—Ross, Howison, Clapp & Korn

[57] ABSTRACT

Method and apparatus for automatically controlling the operation of a rotary extruder, including using a pressure transducer (38, 40, 42) communicating with the annular space (50) between the barrel (12) and rotor (14) to monitor the hydraulic pressure of the melted polymer, using a microprocessor-based controller (62) to compare the measured pressure with a predetermined set point, and thereafter selectively controlling the speed of a feed drive motor (56) or melt drive motor (60) to maintain the melt pressure within a desired range while holding the extruder rotor speed constant.

5 Claims, 3 Drawing Sheets

METHOD AND APPARATUS FOR CONTROLLING ROTARY EXTRUDER

BACKGROUND OF THE INVENTION

1. Field of the Invention

This invention relates to rotary extruders, and more particularly, to a method and apparatus for monitoring pressure within a rotary extruder and for selectively controlling the operation of either a melt pump disposed downstream of the extruder outlet or a feed mechanism supplying material to the extruder based upon pressure deviations within the extruder.

2. Description of the Prior Art

As used herein, the term "rotary extruder" refers to an extruder having a stationary barrel section with an eccentric bore and a rotor that comprises a substantially cylindrical plasticizing surface rotatably mounted within the bore. Polymeric resin, typically in the form of pellets, flakes or powder, is introduced through a feed port into a clearance zone between the rotor and the interior surface of the barrel. As the rotor rotates within the barrel, the resin is plasticized and delivered to a discharge port. Plasticized material exits the barrel and is then usually further pressurized by a melt pump or equivalent means and extruded through a die.

Extruders of this general type, which differ substantially from conventional rotating screw-type extruders in their design and operation, have already been disclosed, for example, in U.S. Pat. Nos. 3,880,564; 4,012,477; 4,501,543; and 4,813,863.

Unlike most conventional screw extruders, rotary extruders are not flood fed, and weigh-belt feeders have been utilized previously in an effort to maintain a constant feed rate. Such rotary extruders have been operated by adjusting the feed rate and the melt pump rate to achieve a desired throughput and then adjusting the speed of the rotor to plasticize that amount of material. In some instances, however, difficulties have been encountered in operating the rotary extruder in this manner.

The average residence time required to plasticize a polymer within a rotary extruder is significantly less than that typically required to plasticize the same polymer in a conventional screw extruder, thereby minimizing the time during which the polymer may be subjected to shear. Due to differences in the internal design of the rotary extruder, however, the hydraulic pressure in the annular space between the rotor and barrel does not always vary in the manner that one might expect when operating a screw extruder.

It has been discovered, for example, that when overfeeding occurs in a rotary extruder operated according to conventional methods, pressure may rise initially but then drop suddenly if the overfeeding is not quickly corrected. Assuming that the melt pump continues to operate at the same speed, the amp load on the rotor drive motor increases in response to the increased amount of unplasticized material within the extruder. As the amount of work being done by the rotor increases, the amount of shear exerted on the polymer also increases, melt viscosity decreases, and melt pressure within the extruder drops. This pressure drop within the extruder barrel as a result of overfeeding is contrary to prior experience with screw extruders.

Several methods and apparatus have previously been disclosed for use in monitoring and controlling melt pressure in screw-type extruders.

U.S. Pat. No. 2,747,222, for example, discloses the use of a bellows in a chamber below the extruder die outlet to sense pressure variations and adjust the speed of pultrusion rollers when pressure limits such as plus or minus 100 psi are exceeded.

U.S. Pat. No. 2,747,224 discloses a pressure control system for a screw-type extruder wherein the speed of the screw is regulated according to the pressure of the plasticized material at or just beyond the delivery end of the screw. With such an extruder and control system, however, melt pressure is increased by increasing the screw speed, which in turn increases the amount of feed entering the barrel. Thus, the melt pressure and the amount of feed are directly proportional, unlike the situation referred to above which has been experienced during operation of the rotary extruder.

U.S. Pat. No. 3,283,041, discloses a method and apparatus for monitoring back pressure in the barrel of a screw-type extruder and for increasing back pressure by cooling the nose of the screw. Plus or minus pressure deviations with respect to a specified set point are used to control a valve that restricts the flow of a cooling medium through the screw. U.S. Pat. No. 3,283,041 also discloses other methods previously utilized to control hydraulic pressure within conventional extruders, including the use of different feed screws to achieve different pressures; the use of flow restrictions or valves at the outlet orifice; and cooling the barrel around selected portions of the screw.

U.S. Pat. No. 3,357,049 discloses a method and apparatus for monitoring and controlling melt pressure in a chamber downstream of an axially reciprocable, rotatable extruder screw through use of a piston adapted to vary the width of the gap between a torpedo disposed on the end of the screw and an annular ring.

U.S. Pat. No. 4,290,986 and 4,197,070 disclose another method and apparatus for monitoring melt pressure near the output end of the barrel of a conventional screw-type extruder, and for maintaining the melt pressure at a desired level by controlling the speed of the extruder screw.

Notwithstanding the methods and apparatus previously disclosed in the prior art, a control system is needed that is useful for monitoring and controlling the melt pressure within a rotary extruder.

SUMMARY OF THE INVENTION

According to the present invention, a method and apparatus are provided for monitoring and controlling melt pressure within the barrel of a rotary extruder. According to a preferred embodiment of the invention, a pressure transducer communicating with the rotary extruder bore continuously monitors the melt pressure and signals a microprocessor, which compares the actual pressure with a preset value. When the difference between the actual pressure and the preset value exceeds a predetermined maximum differential, either higher or lower, another signal is generated and fed to a controller means, which makes the desired correction to bring melt pressure back into the desired range.

According to one embodiment of the invention, the controller means is adapted to automatically increase or decrease the speed of the feed mechanism in response to a corresponding decrease or increase in melt pressure.

According to another embodiment of the invention, the controller means is adapted to automatically increase or decrease the speed of the melt pump in response to a corresponding increase or decrease in melt pressure.

According to another embodiment of the invention, the controller means is adapted to selectively adjust the speed of either the feed mechanism or the melt pump as desired in order to bring the melt pressure back within a predetermined acceptable operating range.

According to another embodiment of the invention, the controller means is adapted to selectively stop and start the feed mechanism in response to melt pressure data received from a pressure transducer communicating with the extruder bore.

According to another embodiment of the invention, a plurality of pressure transducers are spaced apart throughout the extruder bore and are selectively monitored in determining whether melt pressures within the rotary extruder exceed predetermined maximum acceptable differentials for the particular resin being run.

The method and apparatus disclosed herein will enable rotary extruders to be operated with a degree of automation, reliability and predictability not previously attainable. The subject invention will also further enhance the physical properties of polymeric materials plasticized in rotary extruders by providing better control over shear.

BRIEF DESCRIPTION OF THE DRAWINGS

The method and apparatus of the invention are further described and explained in relation to the following figures of the drawings wherein.

Like numerals are used to indicate like parts in all figures of the drawings.

DESCRIPTION OF THE PREFERRED EMBODIMENTS

Figure 1:
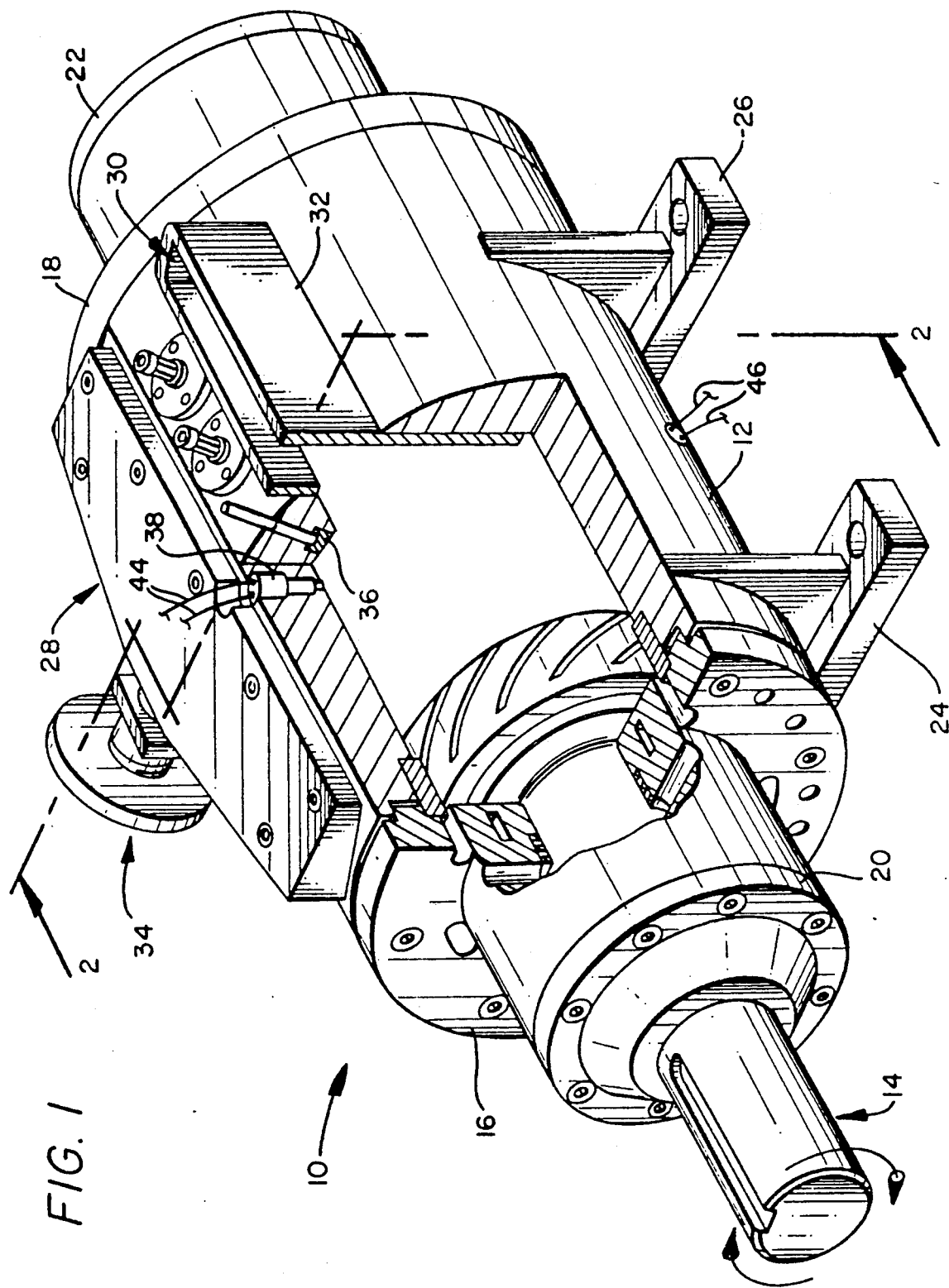
FIG. 1 is a simplified perspective view, partially broken away, of a rotary extruder.
Figure 2:
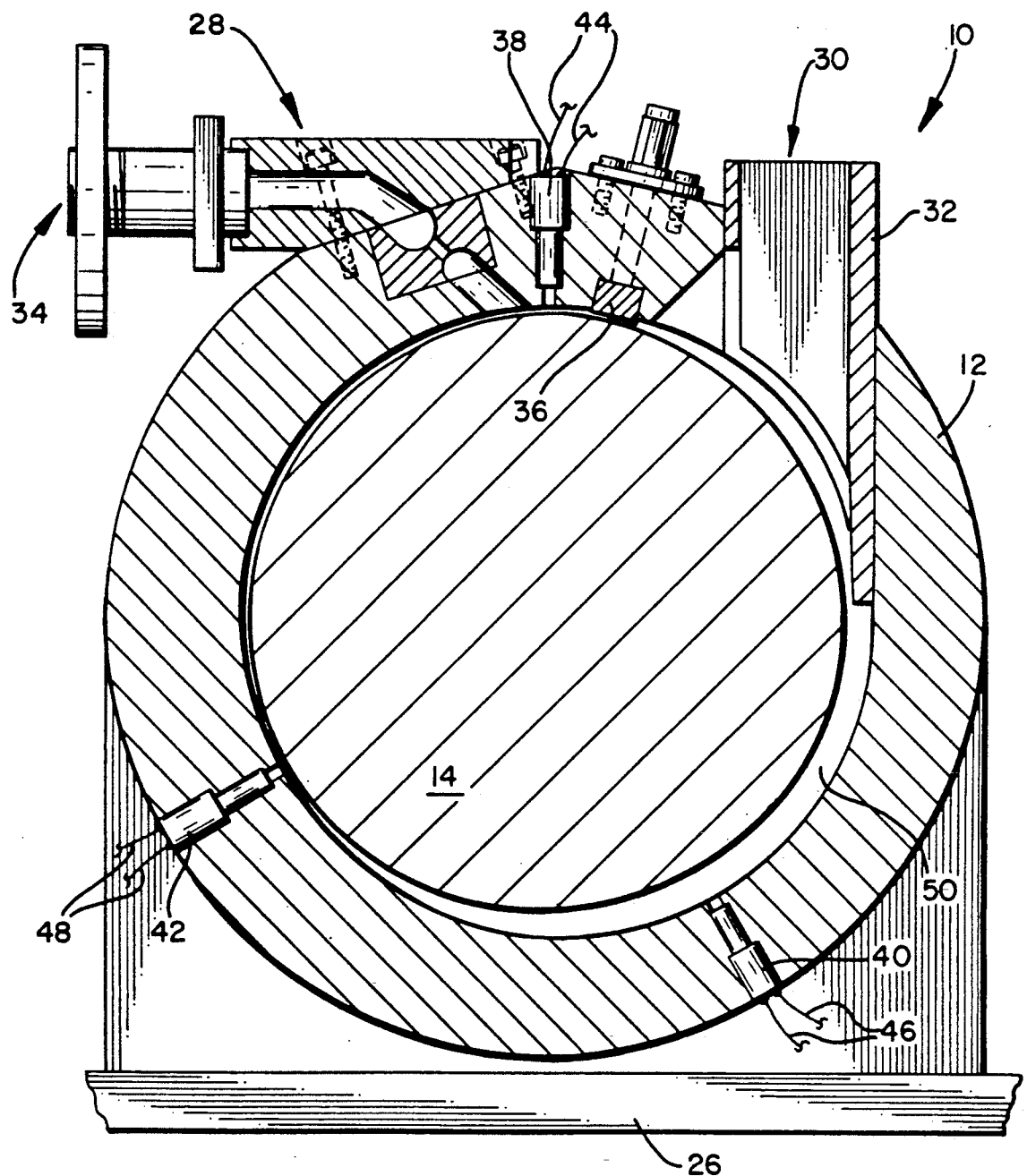
FIG. 2 is a sectional elevation view taken along line 2—2 of FIG. 1, depicting radially spaced pressure transducers communicating with the bore of a rotary extruder.

Referring to FIGS. 1 and 2, rotary extruder 10 preferably comprises substantially cylindrical barrel 12 having rotor 14 rotatably mounted therein. Rotor 14 is supported within barrel 12 by bearings which are disposed inside drive end plate 16 and free end plate 18, and are maintained there by drive end retainer 20 and free end retainer 22, respectively.

Barrel 12 is secured to a supporting surface by mounting legs 24, 26. Rotary extruder 10 further comprises inlet port 30 in feed chute 32 through which the feed material is introduced into barrel 12 of the extruder, and discharge port 34 in discharge manifold 28 through which the plasticized polymeric resin exits the extruder. Adjustable restriction bar assembly 36 controls the amount of plasticized material that is carried back past the inlet port 30 during each rotation of rotor 14 within barrel 12.

Barrel 12 of rotary extruder 10 preferably further comprises pressure transducers 38, 40, 42 provided with signal leads 44, 46, 48, respectively. Pressure transducers 38, 40, 42 are conventional, commercially available transducers having an operating range commensurate with the melt pressures likely to be encountered in extruding polymers on a particular rotary extruder. Dynisco PT422A pressure transducers rated at 0-1500 psi have been satisfactorily utilized in the apparatus of the invention, although it is understood that other similarly effective pressure transducers can also be used in practicing the present invention.

The subject pressure transducers continuously monitor the pressure within annular space 50 between the inside wall of barrel 12 and rotor 14. Although three circumferentially spaced pressure transducers 38, 40, 42 are shown in FIG. 2, it should be understood that both the number and circumferential positioning of the pressure transducers can vary within the scope of the invention. Factors which can affect the number and positioning of transducers used include, for example, the cut of the inside surface of the barrel relative to the rotor, and whether the monitored pressure data is to be used to control a feed driver, the melt pump driver, or another apparatus either upstream or downstream from the extruder. In general, the use of a plurality of transducers disposed at different points around annular space 50 gives the operator increased flexibility for optimizing operation of the rotary extruder under a variety of conditions, depending for example, upon such variables as the feed material, throughput, temperature, melt viscosity, and the like. As shown in FIG. 2, pressure transducer 38 is disposed between outlet port 34 and restriction bar assembly 36, in the "12 o'clock" position. Pressure transducer 40 is disposed in the "5 o'clock" position, closer to inlet port 30, and pressure transducer 42 is disposed in the "8 o'clock" position, approximately halfway between transducers 38 and 40, and on the opposite side of barrel 12 from inlet 30.

Figure 3:
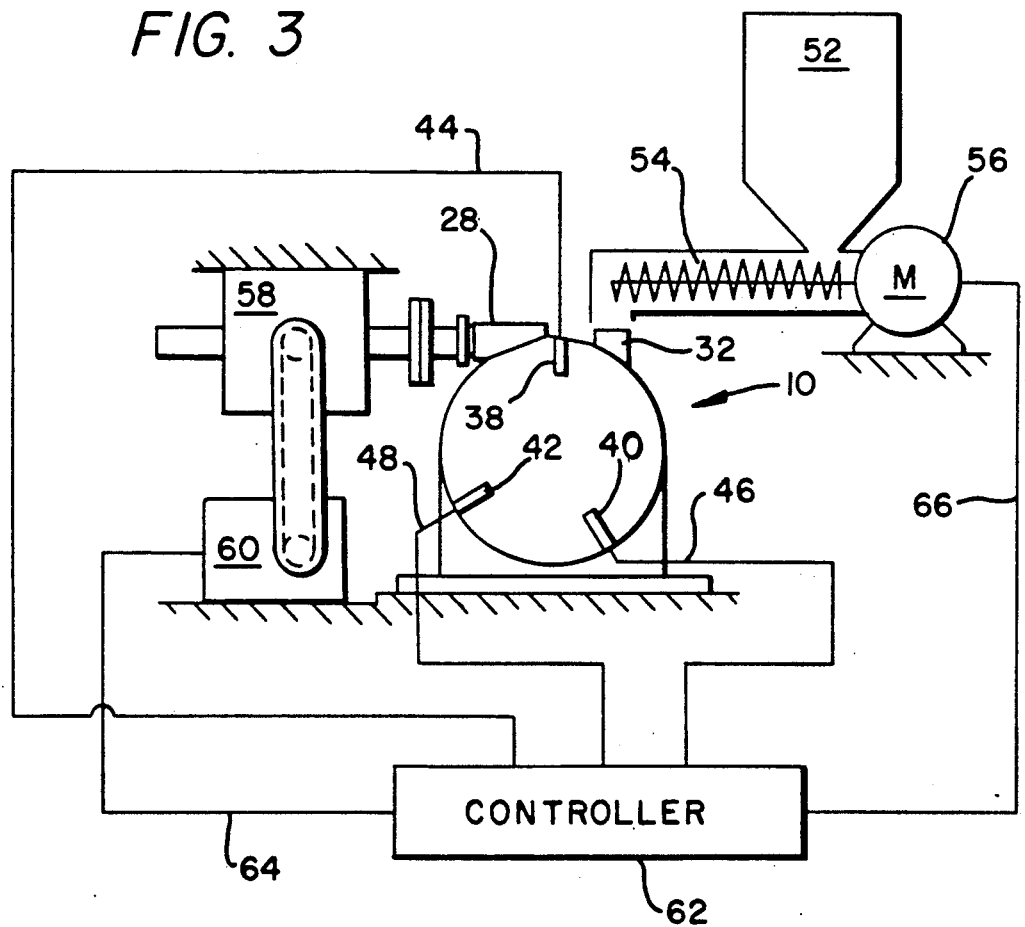
FIG. 3 is a simplified diagrammatic view of a rotary extruder, a feed means, a melt pump and the control system of the invention.

FIG. 3 is a simplified drawing depicting one example of a rotary extruder installation utilizing the control system of the invention. Feed material in hopper 52 is preferably conveyed to feed chute 32 of rotary extruder 10 by auger 54 driven by motor 56, although alternative devices for controlling the rate of feed to rotary extruder 10 can also be used within the scope of the invention. After it has been plasticized, melt exits rotary extruder 10 through discharge manifold 28 and is pumped through melt pump 58 to an extrusion die or other downstream equipment (not shown).

Signal leads 44, 46, 48 from pressure transducers 38, 40, 42, respectively, are preferably connected to controller 62. Controller 62 is shown in simplified diagrammatic form, and as referred to herein, preferably includes a microprocessor, a signal conditioner, and a power supply. A preferred apparatus for use as controller 62 includes a Dynisco Model 659 microprocessor-based pressure controller and an RIS SC1300 signal conditioner.

Controller 62 is preferably adapted to continuously monitor pressure data from one of pressure transducers 38, 40, 42, as selected from a control panel, and to compare the pressure values to a predetermined set point. If the actual pressure level is either over or under the set point in an amount that exceeds the preset tolerance, an appropriate control signal is generated. As shown in FIG. 3, the control signal is either fed through control signal path 66 to motor 56 driving auger 54, or through control signal path 64 to motor 60 driving melt pump 58.

According to one preferred embodiment of the invention, controller 62 is configured to selectively adjust the speed of motors 56 or 58 whenever the pressure within annular space 50 as sensed by one of pressure transducers 38, 40, 42 varies plus or minus 5 psi from the operating pressure set point. While it will be appreciated that controller 62 can be programmed to respond to maximum deviations either greater or less than plus or minus 5 psi, that level of tolerance has been found to be effective for controlling the operation of a rotary extruder in a satisfactory manner.

Alternatively, it may be desirable to use controller 62 to intermittently stop and start feed drive motor 56, for example, rather than adjusting the motor speed, to maintain pressures inside extruder 10 within the preferred range.

The method of the invention is further described and explained in relation to the following examples:

EXAMPLE 1

A rotary extruder having a pressure transducer communicating with the annular space between the rotor and the inside wall of the barrel was installed with a motor-driven auger supplying polyethylene terephthalate (PET) scrap feed material to the extruder inlet, and with a motor-driven melt pump receiving plasticized melt from the extruder outlet and increasing the pressure of such melt to a satisfactory level for forcing the melt through a die. The interior walls of the barrel were cut so that the width of the annular gap between the rotor and barrel decreased continuously from 0.440 inches (about 1.118 cm) at the extruder inlet to 0.110 inches (about 0.28 cm) at the extruder outlet. The pressure transducer, installed at the "8 o'clock" position with reference to the orientation of the rotary extruder as shown in FIG. 2, was operatively coupled to a microprocessor-based pressure controller, which was in turn operatively coupled to the feed drive motor. With the rotor speed, feed drive motor and melt pump drive motor under manual control, satisfactory extrusion was achieved, and the pressure as monitored by the pressure transducer was programmed into the controller as the desired pressure set point. The controller was configured to reduce the speed of the feed drive motor whenever the pressure level increased to a value 5 psi greater than the pressure set point, and to increase the speed of the feed drive motor whenever the pressure level decreased to a value 5 psi less than the pressure set point, and the placed in the automatic mode of operation. Rotor speed and melt pump drive motor speed were held constant. Satisfactory control of the rotary extruder and uniform melt quality were thus achieved.

EXAMPLE 2

A rotary extruder having a pressure transducer communicating with the annular space between the rotor and the inside wall of the barrel was installed with a motor-driven auger supplying polypropylene feed material to the extruder inlet, and with a motor-driven melt pump receiving plasticized melt from the extruder outlet and increasing the pressure of such melt to a satisfactory level for forcing the melt through a die. The interior walls of the barrel were cut so that the width of the annular gap between the rotor and barrel decreased continuously from 0.240 inches (about 0.61 cm) at the extruder inlet to 0.060 inches (about 0.15 cm) at the extruder outlet. The pressure transducer, installed at the "5 o'clock" position with reference to the orientation of the rotary extruder as shown in FIG. 2, was operatively coupled to a microprocessor-based pressure controller, which was in turn operatively coupled to the feed drive motor. With the rotor speed, feed drive motor and melt pump drive motor under manual control, satisfactory extrusion was achieved, and the pressure as monitored by the pressure transducer was programmed into the controller as the desired pressure set point. The controller was configured to reduce the speed of the feed drive motor whenever the pressure level increased to a value 5 psi greater than the pressure set point, and to increase the speed of the feed drive motor whenever the pressure level decreased to a value 5 psi less than the pressure set point, and then placed in the automatic mode of operation. Rotor speed and melt pump drive motor speed were held constant. Satisfactory control of the rotary extruder and uniform melt quality were thus achieved.

EXAMPLE 3

A rotary extruder installed as described in Example 1 was fed with a high density polyethylene and otherwise operated in the manner previously described for Examples 1 and 2. Satisfactory control of the rotary extruder and uniform melt quality were thus achieved.

EXAMPLE 4

A rotary extruder installed as described in Example 2 was fed with PET and otherwise operated in the manner previously described in Examples 1 and 2. Satisfactory control of the rotary extruder and uniform melt quality were thus achieved.

EXAMPLE 5

A rotary extruder having a pressure transducer communicating with the annular space between the rotor and the inside wall of the barrel was installed with a weigh-belt feeder supplying polyethylene terephthalate (PET) feed material to the extruder inlet, and with a motor-driven melt pump receiving plasticized melt from the extruder outlet and increasing the pressure of such melt to a satisfactory level for forcing the melt through a die. The pressure transducer, installed at the extruder outlet manifold, was operatively coupled to a microprocessor-based pressure controller, which was in turn operatively coupled to the melt pump drive motor. With the rotor speed, feed drive motor and melt pump drive motor under manual control, satisfactory extrusion was achieved, and the pressure was monitored by the pressure transducer was programmed into the controller as the desired pressure set point. The controller was configured to increase the speed of the melt pump drive motor whenever the pressure level increased to a value 5 psi greater than the pressure set point, and to decrease the speed of the melt pump drive motor whenever the pressure level increased to a value 5 psi greater than the pressure set point, and to decrease the speed of the melt pump drive motor whenever the pressure level decreased to a value 5 psi less than the pressure set point, and then placed in the automatic mode of operation. Rotor speed and feed drive motor speed were held constant. Satisfactory control of the rotary extruder and uniform melt quality were thus achieved.

Other alterations and modifications of the subject invention will become obvious to those of ordinary skill in the art upon reading this disclosure, and it is intended that the present invention be limited only by the broadest interpretation of the appended claims to which the inventor may be legally entitled.

We claim:

1. Apparatus for plasticizing polymeric material, said apparatus comprising in combination:

A rotary extruder having a stationary barrel with an eccentric bore, a rotor that comprises a substantially cylindrical plasticizing surface rotatably mounted within the bore, said barrel and said rotor defining an annular space therebetween; and drive means for rotating said rotor at a desired rate of rotation within said barrel to plasticize said polymeric material and thereby establish a hydraulic pressure within said annular space;

A feeder device for controllably introducing feed comprising polymeric material into the annular space within said rotary extruder, and drive means for actuating said feeder device;

Means for continuously sensing hydraulic pressure of the plasticized polymeric material within said annular space;

Means for comparing the hydraulic pressure sensed within said annular space to a predetermined set point; and Means for controlling said drive means actuating said feeder device to maintain said hydraulic pressure within a predetermined range around said predetermined set point while holding the rate of rotation of said rotor substantially constant.

2. Apparatus for plasticizing polymeric material, said apparatus comprising in combination:

A rotary extruder having a stationary barrel with an eccentric bore, a rotor that comprises a substantially cylindrical plasticizing surface rotatably mounted within the bore; said barrel and said rotor defining an annular space therebetween; and drive means for rotating said rotor at a desired rate of rotation within said barrel to plasticize said polymeric material and thereby establish a hydraulic pressure within said annular space;

A downstream device for further pressurizing the plasticized polymeric material discharged from said rotary extruder, and drive means for actuating said device;

Means for continuously sensing hydraulic pressure of the plasticized polymeric material within said annular space;

Means for comparing the hydraulic pressure sensed within said annular space to a predetermined set point; and Means for controlling said drive means of said downstream device to maintain said hydraulic pressure within a predetermined range around said predetermined set point while holding the rate of rotation of said rotor substantially constant.

3. Apparatus for plasticizing polymeric material, said apparatus comprising in combination:

A rotary extruder having a stationary barrel with an eccentric bore, a rotor that comprises a substantially cylindrical plasticizing surface rotatably mounted within the bore, said barrel and said rotor defining an annular space therebetween; and drive means for rotating said rotor at a desired rate of rotation within said barrel to plasticize said polymeric material and thereby establish a hydraulic pressure within the annular space;

A first device for controllably introducing feed comprising polymeric material into the annular space within said rotary extruder, and drive means for actuating said first device;

A second device for further pressurizing the plasticized polymeric material discharged from said rotary extruder, and drive means for actuating said second device;

Means for continuously sensing hydraulic pressure of the plasticized polymeric material within said annular space;

Means for comparing the hydraulic pressure sensed within said annular space to a predetermined set point; and Means for selectively controlling one of said drive means actuating said first device and said drive means actuating said second device to maintain said hydraulic pressure within a predetermined range around said predetermined set point while holding the rate of rotation of said rotor substantially constant.

4. A method for controlling the operation of a rotary extruder installed in combination with a motor-driven feeder, said rotary extruder having a stationary barrel with an eccentric bore, a rotor that comprises a substantially cylindrical plasticizing surface rotatably mounted within the bore, said barrel and said rotor defining an annular space therebetween, and drive means for rotating said rotor at a desired rate of rotation within said barrel to plasticize said polymeric material and thereby establish a hydraulic pressure within the annular space; said method comprising the steps of:

Continuously monitoring the pressure of the plasticized polymeric material within said annular space;

Continuously comparing the monitored pressure with a predetermined set point; and Controlling said feeder motor to maintain the monitored pressure within said annular space within a predetermined range while holding the rate of rotation of said rotor substantially constant.

5. A method for controlling the operation of a rotary extruder installed in combination with a motor-driven melt pump, said rotary extruder having a stationary barrel with an eccentric bore, a rotor that comprises a substantially cylindrical plasticizing surface rotatably mounted within the bore, said barrel and said rotor defining an annular space therebetween; and drive means for rotating said rotor at a desired rate of rotation within said barrel to plasticize said polymeric material and thereby establish a melt pressure within the annular space; said method comprising the steps of:

Continuously monitoring the melt pressure of the plasticized polymeric material within said annular space;

Continuously comparing the monitored pressure with a predetermined set point; and Controlling said melt pump to maintain the monitored pressure within said annular space within a predetermined range while holding the rate of rotation of said rotor substantially constant.

* * * * *

UNITED STATES PATENT AND TRADEMARK OFFICE
CERTIFICATE OF CORRECTION

PATENT NO. : 5,045,252
DATED : SEPTEMBER 3, 1991
INVENTOR(S) : Granville J. Hahn, Allen C. Bailey and Richard D. Antrim It is certified that error appears in the above-identified patent and that said Letters Patent is hereby corrected as shown below:

On the Title page

On the face of the patent, under Abstract, line 9 insert:

--pump-- after the word melt and before the word drive.

Signed and Sealed this

Twenty-sixth Day of January, 1993

Attest:

STEPHEN G. KUNIN

*Attesting Officer*  *Acting Commissioner of Patents and Trademarks*